(12) United States Patent
Adams et al.

(10) Patent No.: US 6,975,832 B2
(45) Date of Patent: Dec. 13, 2005

(54) PHOTO ALBUM WITH PROVISION FOR MEDIA PLAYBACK

(75) Inventors: Guy de Warrenne Bruce Adams, Gloucestershire (GB); David Mark Frohlich, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 224 days.

(21) Appl. No.: 10/387,137

(22) Filed: Mar. 13, 2003

(65) Prior Publication Data

US 2004/0008209 A1    Jan. 15, 2004

(30) Foreign Application Priority Data

Mar. 13, 2002  (GB) .................................. 0205880.8

(51) Int. Cl.[7] .......................... G09B 5/00; G04B 5/04; G09G 5/00; G09F 27/00; B42D 3/00
(52) U.S. Cl. ...................... 434/317; 345/619; 434/308; 434/309; 434/318; 40/455; 281/31
(58) Field of Search ........ 345/619–631; 434/308–309, 434/317, 319; 40/455; 281/31

(56) References Cited

U.S. PATENT DOCUMENTS

| 3,439,598 | A |  | 4/1969 | Weitzner et al. |
| 4,270,853 | A |  | 6/1981 | Hatada et al. |
| 4,270,854 | A |  | 6/1981 | Stemme et al. |
| 4,809,246 | A |  | 2/1989 | Jeng |
| 4,905,029 | A |  | 2/1990 | Kelley |
| 5,276,472 | A |  | 1/1994 | Bell et al. |
| 5,956,682 | A |  | 9/1999 | Loudermilk et al. |
| 6,072,980 | A | * | 6/2000 | Manico et al. .............. 434/317 |
| 6,229,964 | B1 |  | 5/2001 | Bell |
| 6,363,239 | B1 | * | 3/2002 | Tutt et al. ................... 434/317 |
| 2002/0180879 | A1 | * | 12/2002 | Shiohara ................ 348/333.05 |

FOREIGN PATENT DOCUMENTS

| EP | 1 079 264 |  | 2/2001 |
| EP | 1 079 268 | A1 | 2/2001 |
| EP | 1 260 380 |  | 11/2002 |
| WO | 00/03299 |  | 1/2000 |
| WO | 00/48388 |  | 8/2000 |

\* cited by examiner

Primary Examiner—Jeffery Brier
Assistant Examiner—Eric Woods

(57) ABSTRACT

A multi-media photograph album comprises a network of electrical conductors which connect with plural data storage devices storing audio data and/or image data. A user, via a user interface, selectively addresses the data storage devices. The user selects individual sound bites for immediate playback via a speaker in the photo album, or via transmission over a wireless link, for playback through an external audio device, for example a hi-fi system. Image data are retrieved from the data storage devices and sent via a wireless link to an image data storage device, e.g., a personal computer. The data storage device can be embedded within a photograph, or can be a separate data storage device attached to the album.

20 Claims, 15 Drawing Sheets

PHOTO ALBUM WITH PROVISION FOR MEDIA PLAYBACK

FIELD OF THE INVENTION

The present invention relates to the fields of photography and audio systems and particularly, although not exclusively to photograph albums and methods of presenting photographs combined with audio.

BACKGROUND THE INVENTION

The assignees have performed a study to assess the way in which end users of photographic images perceive their use of those images, and what values they assign to the use of their images. One of the findings of this work is that audio data captured at the time of capture of a photographic image is perceived as having significant value to an end user. Such audio data encompasses not only catalogue narrative, for example narrative describing the time, place and date at which a photograph was taken, but also descriptive narrative, that is audio data describing the content of the image, for example "This is Lucy at her birthday party" or the like, and also context specific audio data such as ambient noise or noise provided by a subject of a photograph, for example in connection with a photograph of a baby, audio data recording the baby's crying. The recorded audio data can be of any type, similar to the types of audio data collected in connection with conventional prior art video sequences.

The assignees have recognized that as an intermediate step between still photograph images, without audio data, and full video sequences comprising video frames with accompanying real-time audio data with over-dubbing, there is an intermediate layer product, comprising still photograph images and associated with those still photograph images, sound bites, where the sound bites comprise audio data, in particular context specific audio data, also encompassing descriptive narrative and/or catalogue narrative audio data.

Capture of sound data at the same time as capture of image data is known in the prior art, in various forms extending back over thirty years. Photograph formats having a magnetic strip for sound recording are known in U.S. Pat. No. 3,439,598; U.S. Pat. No. 4,270,853; U.S. Pat. No. 4,905,029; U.S. Pat. No. 4,270,854; and U.S. Pat. No. 5,276,472.

Conventional photographic images, resulting from developed photographs printed onto paper or film, are displayed typically by means of a hand-held photograph album, being a book having pages onto which the photographs are attached. Other methods of display, for example slide projectors which display still images in sequence, are known.

There is a known photograph album available from Brookstone (HTTP://brookstone.com) which comprises a photograph album having pages, for attachment of flash film photographs in conventional manner, and a module positioned at the bottom of the pages, which allows a user to record up to ten audio sound bites, that is, ten individual sequences of recorded audio sound. However, the functionality of the Brookstone product is very limited in flexibility of association between images and sound bites.

Grouping of images with sound passages to form a linked group is known in WO 00/48388. Further, individual data storage devices capable of storing individual passages of sound are known from WO 00/03299.

However, the above prior art technologies are disparate and do not provide a unified system which is compact and easy to use for playback and manipulation of audio sounds captured at the same time as an image sound.

Specific implementations according to the present invention aim to provide a simple and easy to use method of and apparatus for presenting individual still images in conjunction with audio sound bites recorded at the same time as the still images, in a form suitable for general consumer use.

SUMMARY OF THE INVENTION

The inventors have addressed a product comprising plural still photograph images, each having an associated sound bite of ambient context related audio data recorded at the time the associated still photograph, i.e., image, was taken.

According to one aspect of the invention, a photograph album for storing a plurality of photographs comprises pages for mounting two dimensional photographs and an array of conductive tracks for communicating with plural memories that store data related to the photographs and are carried by the album: a controller selects individual ones of the memories carried by the album and reads data stored in the memories. The controller has a video circuit, a video display and an image display that respectively display video sequences downloaded from the memories, display video sequences downloaded from the memories and display a still image downloaded from one of the memories.

Another aspect of the invention relates to a photograph storage system including a photograph album that carries memories for storing data corresponding to a photograph stored in the album. The photograph album has two dimensional arrays of electrically conductive tracks that communicate with the memories. A controller individually addresses each of the memories and downloads data from the memories. Conductors provide electrical access to the memories via the tracks. Each photograph carries at least one memory. The photograph album also has a ring binder mechanism and plural loose leaf pages. Each of the loose leaf pages carries a network of electrically conductive tracks such that placement of one of the photographs on one of the pages enables electrical connection of the data storage device carried by the photograph with the electrically conductive tracks.

An additional aspect of the invention relates to a multi-media photograph album that stores plural photographs. The photograph album has an array of conductive tracks that contact plural memories carried by the album. A user interface including a visual display arranged to identify a physical position of the conductive track network enables a user to select a data storage device. A controller coupled with the user interface addresses and downloads the data from the selected data memory in response to a selection by the user activating the user interface to select a particular data storage device.

A further aspect of the invention relates to a multi-media photograph album that stores plural photographs and includes an array of conductive tracks that contact plural memories for storing electrical signals representing digital data associated with an image and carried by the album. A user interface enables a user to select memory. A controller coupled with the user interface addresses and downloads the data from the selected memory in response to a selection by the user activating the user interface to select a particular memory. A play-back circuit plays the data downloaded from a selected memory. The user interface comprises a visual display that identifies an individual one of the memories connected to the array of conductive tracks. A controller increments and decrements a selected physical position on the conductive track network.

An added aspect of the invention relates to a method of addressing individual data storage devices in a photograph storage system including a photograph album and a plurality of memories. The photograph album has arrays of electrically conductive tracks that engage at least one memory. A controller individually addresses each of the memories to download data from the memories. One of the memories comprises at least one conductor that provides electrical access to the memory. The method comprises sending an interrogation command having a device identifier from the controller across the array of electrically conductive tracks to the memories. Data stored in the memory having the identified device are read. The read data stored in the memory are coupled to a user of the album. The read and coupled data are video sequence data representing a video sequence matching a corresponding respective photograph stored in the photograph album.

An added aspect of the invention concerns addressing individual memories in a photograph storage system including a photograph album and plural memories. The photograph album has arrays of electrically conductive tracks that engage at least one memory and a controller that individually addresses each of the memories engaging the array of conductive tracks for downloading data from the memories. The memories have at least one conductor providing electrical access to the memory. The method includes sending an interrogation command having a device identifier from the controller via the array of electrically conductive tracks. The controller responds to no identifier data received from any memories in response to the interrogation command, by defining new unique identifier data and sending the new unique identifier data on the plural conductive tracks. The unique identifier data is stored in one of the memories. Then the controller issues a flag set command. A flag is set within the memory in response to the issued flag set command. A memory responds to the set flag by locking the received identifier data in a memory of the memory to thereby uniquely identify the memory.

BRIEF DESCRIPTION OF THE DRAWING

For a better understanding of the invention and to show how the same may be carded into effect, there will now be described by way of example only, specific embodiments, methods and processes according to the present invention with reference to the accompanying drawing in which.

DETAILED DESCRIPTION OF THE DRAWING

Figure 1:
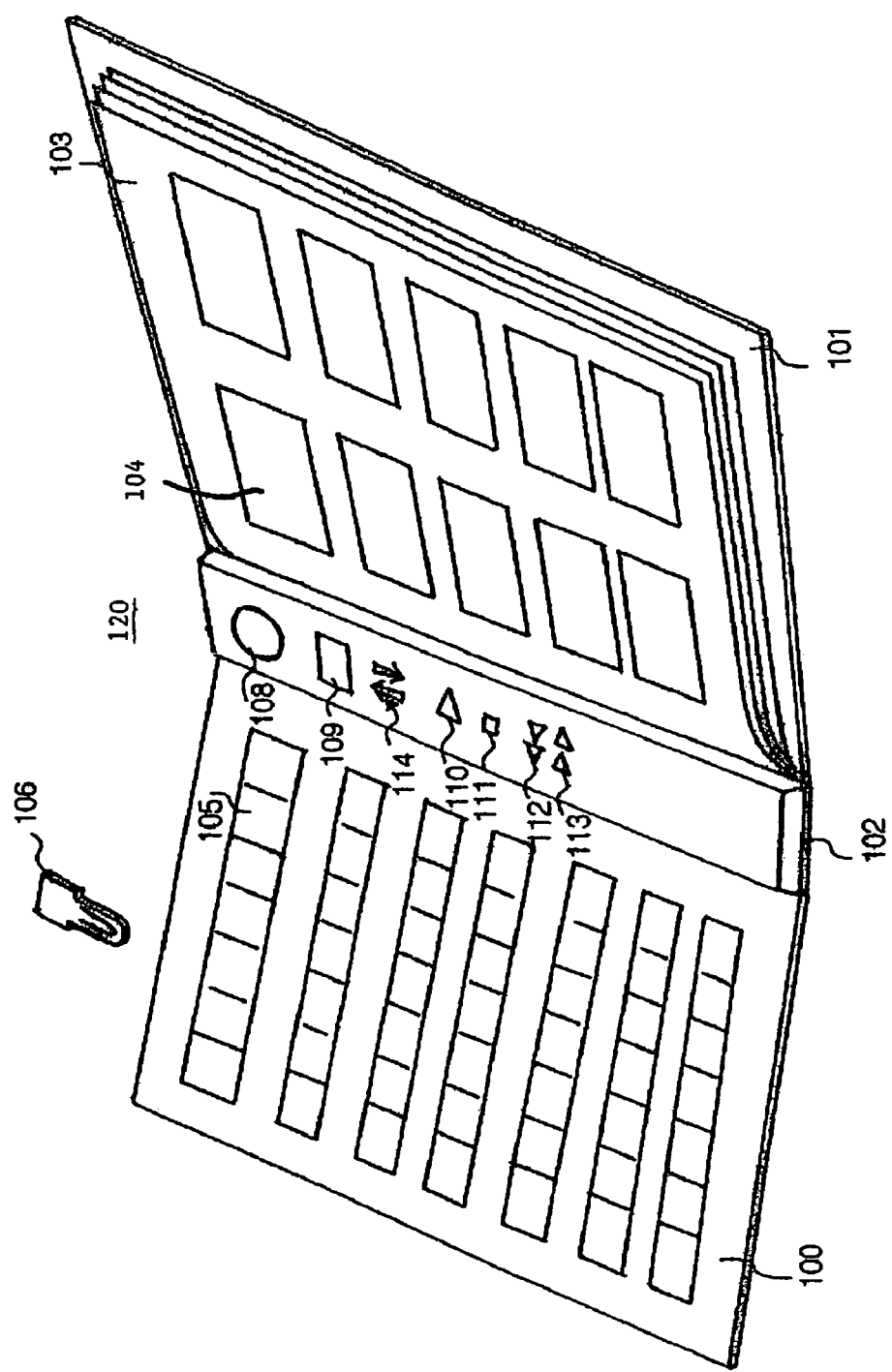
FIG. 1 is a perspective diagram of a first multi-media photograph album according to a first embodiment of the present invention.

The will now be described by way of example the best mode contemplated by the inventors for carrying out the invention. In the following description numerous specific details are set forth in order to provide a thorough understanding of the present invention. It will be apparent however, to one skilled in the art, that the present invention can be practiced without limitation to these specific details. In other instances, well known methods and structures have not been described in detail so as not to unnecessarily obscure the preset invention.

In this specification and the accompanying claims, the term "image data" encompasses video data or video sequences. It will be appreciated that video sequences can comprise a plurality of still images, each of which can be stored or converted into a still image data.

In one specific implementation according to the present invention, a photograph album is configured for operation with data storage devices which are clipped into pockets provided on a cover of the photograph album, whereby when a clip is inserted in a pocket, electrical connectors on the clip data storage device are connected to conductive tracks, to provide electrical connection between the data storage device and a controller-decoder system of a data processor device included in the photograph album.

A plurality of data storage devices are simultaneously connected to a network of conductive tracks. Each data storage device can be addressed individually. A decoder on the photograph album provides individual addressing of each data storage device connected to the pages.

The type of data stored can include:

audio data, comprising for example an audio data sound bite being a sound (i.e., aural) passage captured substantially at the same time as image data, or recorded at any time after capture of the corresponding image data;

image data representing a still image corresponding to a photograph;

video data representing a video sequence;

meta-data comprising, for example, data describing the time and/or place at which audio, image or video data were recorded; arrangement data describing a relationship between audio data, image data or video data; data describing a person responsible for recording audio data, image data or video data; and like data generally suitable for cataloguing or recording bibliographic details of audio, image or video data recorded and/or for arranging the audio data, image data and video data within a storage system.

In some control arrangements, individual data storage devices are addressed sequentially and automatically and, in other arrangements, the storage devices are individually addressable in response to user commands.

Where a paperclip styled data storage device is provided, a tongue portion of the clip style data storage device includes electrical contacts. When the data storage device is subsequently placed over a pocket on a page of the album, contact is made between the conductive tracks on the page and the electrical connectors on a tongue portion of the clip.

Each data storage device typically has an individual unique address such that when multiple devices are placed in the album, each data storage device can be individually addressed. Each image data references corresponding audio data. The image data can be represented physically as a physical photograph or be stored as a still image data and/or video sequence on a data storage device.

The decoder preferably operates as a serial bus and acts as a communication device to other peripheral devices, for example, a printer or a television receiver.

In a second specific embodiment according to the present invention, a photograph album comprises a plurality of leaves each having a set of conductive tracks which allow arbitrary connections of plural data storage devices that store audio data and/or image data. The photograph album includes at least one audio playback device and optionally a driver for sending image data to a printer device via a communications link, for example, an infra-red wireless link.

In the second embodiment, data storage devices are embedded in a physical paper or plastic based photograph and stored within a photograph album. In this embodiment, pages of the album connect with electrical connectors of a data storage device via tracks embedded on a page. Subsequent connection between electrical connectors and a decoder is via conductive rings which pass electrical connection to the decoder. The album has plural replaceable and removable leaves, each capable of making electrical connection with a back sheet of the photograph album.

The conductive tracks comprise a metal or other conductive material such as a conductive polymer. The tracks are typically printed or embedded on a page of the album.

In embodiments in which a data storage device is incorporated Into a physical photograph, a page of an album can have contacts placed to engage individual electrical connectors of the data storage device on each photograph. Electrical contact is typically made to electrical connectors on the rear of the photographs. In a single page of the album, several sets of contacts allow a user a choice in where the photograph is placed relative to the page.

The pages can be permanently bound into an album or can be replaceable. In the case of replaceable/removable pages, conductive strips on the album page can contact conductive rings which perform the dual purpose of physically holding the album page within the album and providing electrical contact to the conductive wires on each page.

In another variation, conductive tracks are placed along an edge of an album page and clip data storage devices are attached along the edge, next to a photograph to which the clip data storage devices relate.

The person skilled in the art will appreciate that there are numerous variations and different implementations possible according to the present invention. The following describes individual preferred implementations and embodiments.

Referring to FIG. 1 a first multi-media photograph album 120 includes (1) a substantially planar front cover 100, (2) a substantially planar back cover 101, (3) a spine portion 102 connecting covers 100 and 101, and (4) a plurality of pages 103, bound to the spine 102. Each page 103 is arranged so a plurality of conventional paper or film photographs 104 can be attached to one or both sides of the page.

The front inside face of cover 100 includes a plurality of transparent pockets 105, for example plastic pockets for containing or attaching a plurality of clip-on data storage devices 106 to cover 100. Each pocket 105 is identified by a numeric value or other identifier, which matches the pocket with a corresponding respective position on one of pages 103, to which one or more photographs is attachable. The data storage device 106 stores audio data in the form of an audio sound bite, relating to a photograph attached at the page position corresponding to the pocket identifier.

The central spine 102 of multi-media photograph album 120 includes a controller provided in a user console, the controller comprising an audio speaker 108, a display 109, for example a liquid crystal display; a "play" button 110; a "stops" button 111; a "fast rewind" button 112; and a "fast forward" button 113. Additionally, controller 107 comprises a pair of selector buttons 114 (up-down buttons), the pressing of which causes individual pocket positions to be stepped to read data from data storage devices 106 clipped into the pocket positions.

An indication of the currently selected pocket position is displayed on the liquid crystal display device 109.

Pairs of elongated electrical leads 302 and 303 (FIG. 3) run horizontally along each row of pockets, in order to read the audio data from the data storage devices 106, in response to a user selecting the particular pocket using the display 109 and pocket selector buttons 114 which increment or decrement the pocket position currently selected.

In use, a user fills up the multi-media photograph album 120 with photographs by attaching them to the pages 103. As each or individual photographs is attached to a page 103, the user inserts a data storage device 106 in the corresponding respective pocket 105 having a position number which matches the position of the photograph. Insertion into the pocket 105 of the data storage device 106 results in electrical contact of the storage device with electrically conductive strips (not shown) inside the pocket. The strips in pockets 105 in one row of pockets are electrically connected to leads 302 and 303 associated with the row in which the pocket is located such that the multi-media photograph album can read the audio data and play back the audio data corresponding to a particular selected pocket, which in turn corresponds to a particular photograph, by pressing the play button 110.

Figure 2:
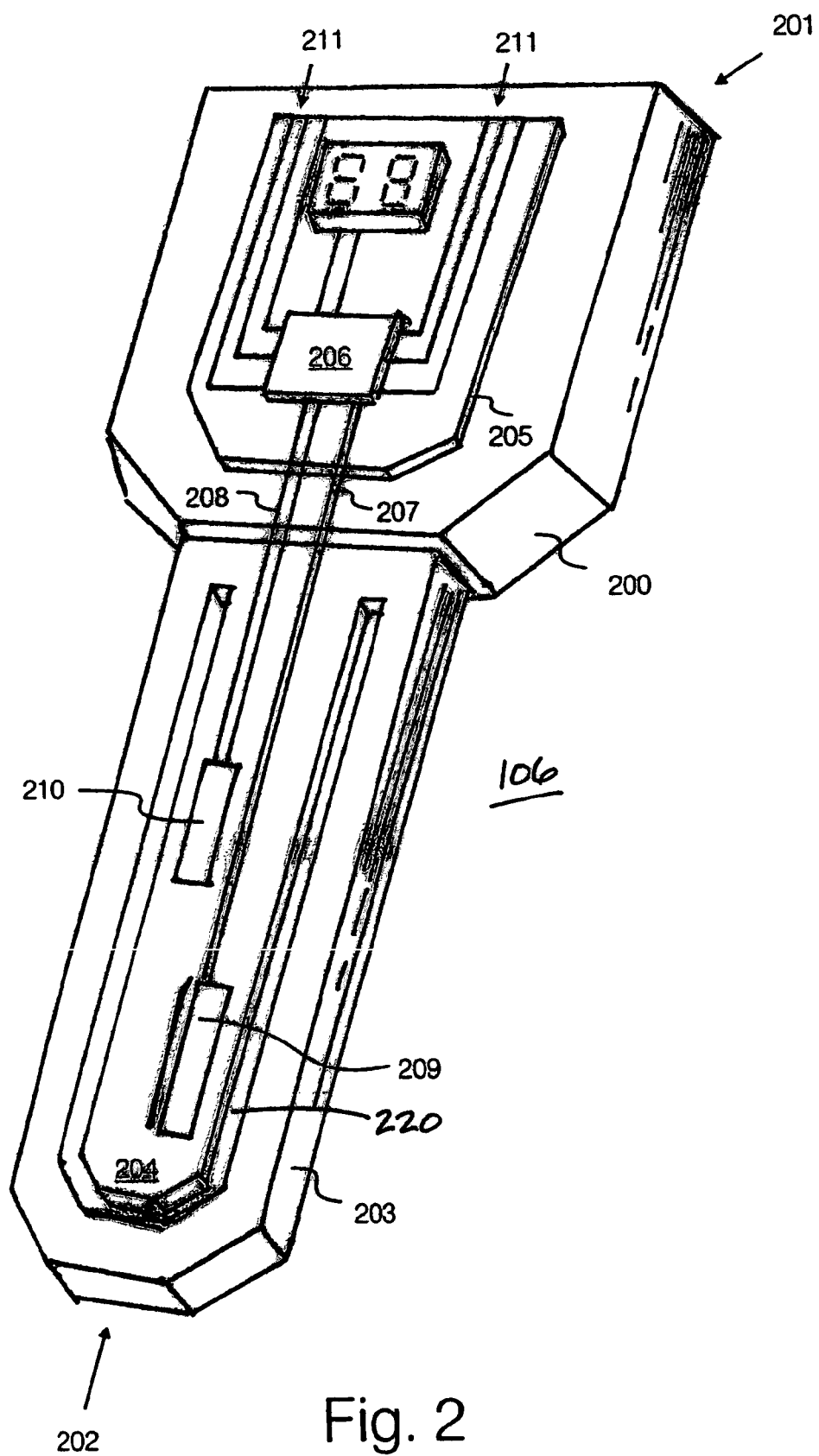
FIG. 2 is a perspective diagram of a clip data storage device of FIG. 1, wherein the clip data storage device stores audio and/or image data.

Referring to FIG. 2 herein, there is illustrated schematically a clip style data storage device 106 for use with the multi-media photograph album 120 of FIG. 1. The data storage device 106 comprises an electrically insulating, preferably translucent or transparent plastic housing 200 of a size and form suitable for grasping between a thumb and fore-finger of a human hand. Housing 200 has an upper end 201 shaped in the form of a sheet and a lower portion 202 shaped in the form of a clip, having an outer portion 203 and inner tongue 204; slot 220 is between portion 203 and tongue 204. Portion 203, tongue 204 and slot 220 are arranged so that opposite faces of the portion 203 and tongue 204 can bear against opposite faces of cover 100 so storage device 106 can be mounted on the cover in a manner similar to mounting a paper clip on a piece of paper. It will be appreciated by a person skilled in the art that physically, the data storage device should be small, typically of a size similar to a conventional house key or smaller, and be capable of clipping or otherwise attaching within a plastics pocket. It will be appreciated by those skilled in the art that many design variations to perform this physical function are possible.

The plastic housing 200 includes an electronically insulating substrate 205 containing a data storage chip 206. The data storage chip 206 has first and second electrical conductors 207, 208 leading to first and second electrical contact pads 209, 210 mounted on inner tongue 204, and respectively engaging corresponding respective strip conductors (not shown) within the pocket, when the housing 200 is fully inserted into a pocket of the multi-media photograph album.

The data storage chip 206 typically comprises a known integrated circuit device capable of storing audio data and powered via a second set of electrical contacts 211, or through electrical power received through first and second contacts 209, 210 on the tongue portion 204.

In the first specific embodiment, where the pockets for the clip data storage devices 106 are, for example, numbered 1–40, corresponding to numbered positions 1–40 on different pages of the album 120, relying on matching of page position and clip position does not guarantee that the correct data are played back for a particular photograph.

One solution to this problem is to include a controller 300 (FIG. 3) in album 120. When a data storage device 106 is added to album 120, a user activates controller 300 to select a number which corresponds with an image location on the user interface. In response to the clip data storage device 106 being placed in the pocket, controller 300 in album 120 detects the new clip, reads an identification number and an image number which are unique to the data storage device 106, and then maps the identification number to the image number. The controller 300 includes a look-up table containing all mappings between image number and unique identification number.

Once controller 300 has identified that a new data storage device 106 is present in album 120, the controller sets a flag within the data storage device. Controller 300 locks the data storage device 106 so device 106 responds only to that unique identifier data. In response to the controller searching for the next new clip 106, the clips 106 previously inserted in album 120 do not all respond. Further, clip data storage devices 106 can be addressed by their unique identifier data at any time.

In an alternative embodiment, controller 300 can write to an address in the clip data storage device 106 which is reserved for storage of a position number in the album 120. Once this position number is programmed into the data storage device 106, when the user wishes to access the clip data storage device 106, the controller 300 in the album 120 is able to reference all the devices 106 by these identifiers. If the album 120 is to be reconstructed, these numbers are re-written for any new locations from which the dip data storage devices 106 are removed and into which devices 106 are re-inserted.

As an alternative to providing a display on the user interface, each clip data storage device 106 is provided with a light emitting display to indicate that a particular data storage device is being addressed. The display need not be an alpha-numeric display that is provided on the clip data storage device, but can be a simple light emitting diode. Alternatively, an alpha-numeric liquid crystal display can be used, or a liquid crystal display having a specially designed display icon can indicate the particular clip device 106 is being addressed by the controller 300.

Figure 3:
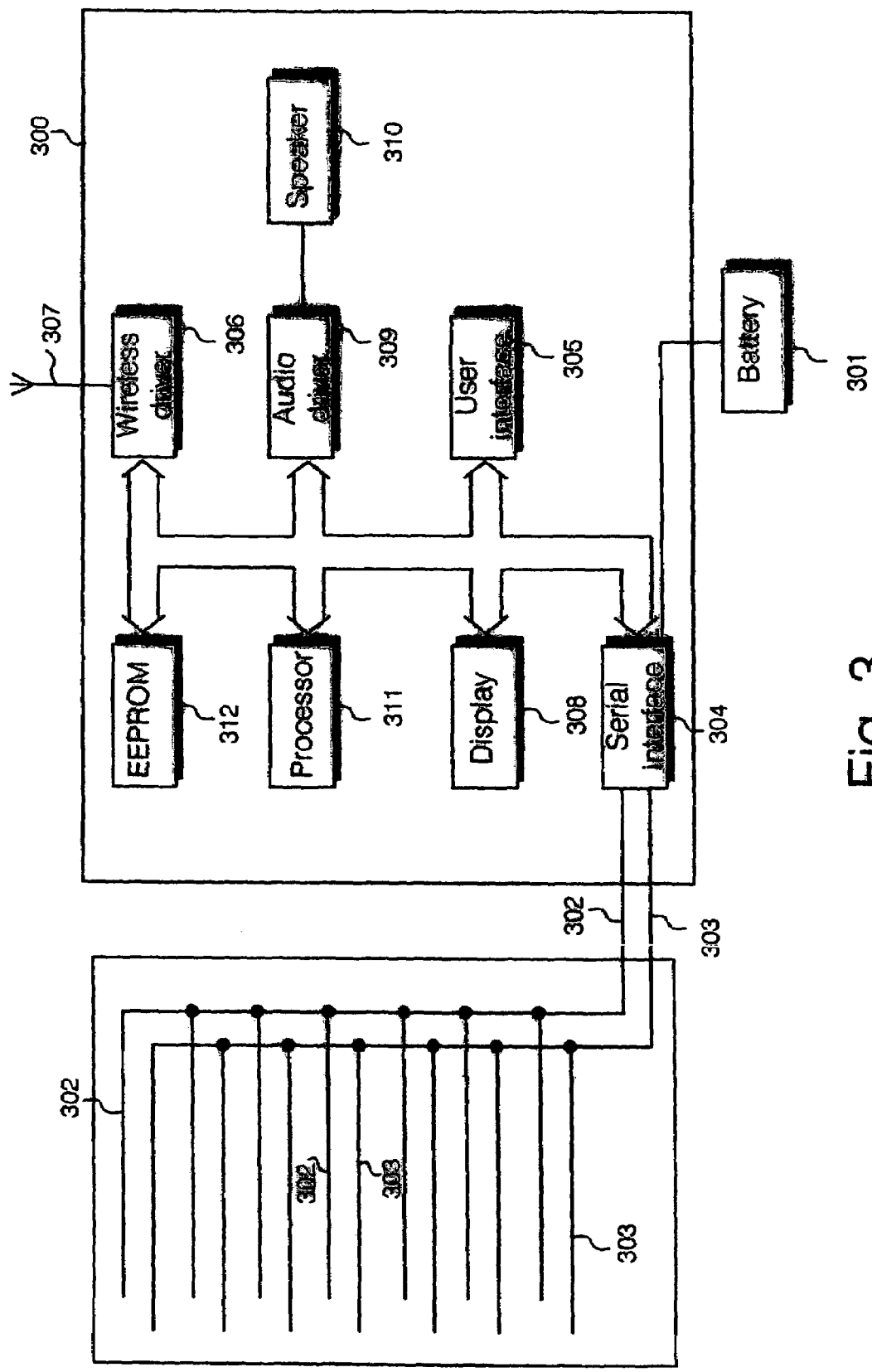
FIG. 3 is a schematic diagram of a controller and conductive track network comprising the first photograph album of FIG. 1 and clip data storage device of FIG. 3.

Referring to FIG. 3 herein, there is illustrated schematically in further detail, electrical components of the first photograph album. Controller 300, which performs a decoding function, is powered by a battery 301. The controller 300 includes a serial interface 304 connected via a pair of conductors 302, 303 to one or a plurality of data storage devices 106 located in pockets on the inside cover of the album 120.

The inside cover 100 of album 120 includes an array of electrically conductive strips, including a pair of first and second elongated electrical conductors 302, 303 for each of a plurality of rows on the cover. Each row includes a first conductive strip 302 and a second conductive strip 303. Strips 302 and 303 are arranged in parallel across the inside cover 100 to form conductive tracks to which the electrical contacts of the data storage device 106 connect when the data storage device is properly located in a pocket on inside cover 100. The pairs of conductive strips 302 and 303 run across rows of pockets and are simultaneously capable of establishing ohmic contact with plural individual data storage devices 106 in a row. If all the pockets of cover 100 carry a data storage device 106, strips 302 and 303 simultaneously connect all data storage devices 106 located on the inside cover 100 to interface 304.

Serial interface 304 of controller 300 addresses individual data storage devices located on the inside cover 100 via the first and second conductors 302, 303. Controller 300 also includes (1) a user interface 305 for selecting individual data storage devices 106, and activating play of audio data stored in devices 106, or transmission of downloaded data to a remote device (not shown); (2) a wireless driver 306 for sending the data read from a data storage device 106 or a remote play back device (the wireless driver has an antenna 307); (3) a display 308, for displaying selection of individual data storage devices; (4) an audio driver 309 for driving a speaker 310 to play an aural message (i.e., data) from a selected data storage device; (5) processor 311 for controlling the user interface, display, serial interface, audio driver and wireless driver according to program instructions; and (6) an electrically erasable programmable read only memory (EEPROM) 312 that stores program instructions to control the user interface 305, selection of data storage devices, downloading and playback of audio data, transmission of audio data to a remote device and downloading and transmission of image data.

Figure 4:
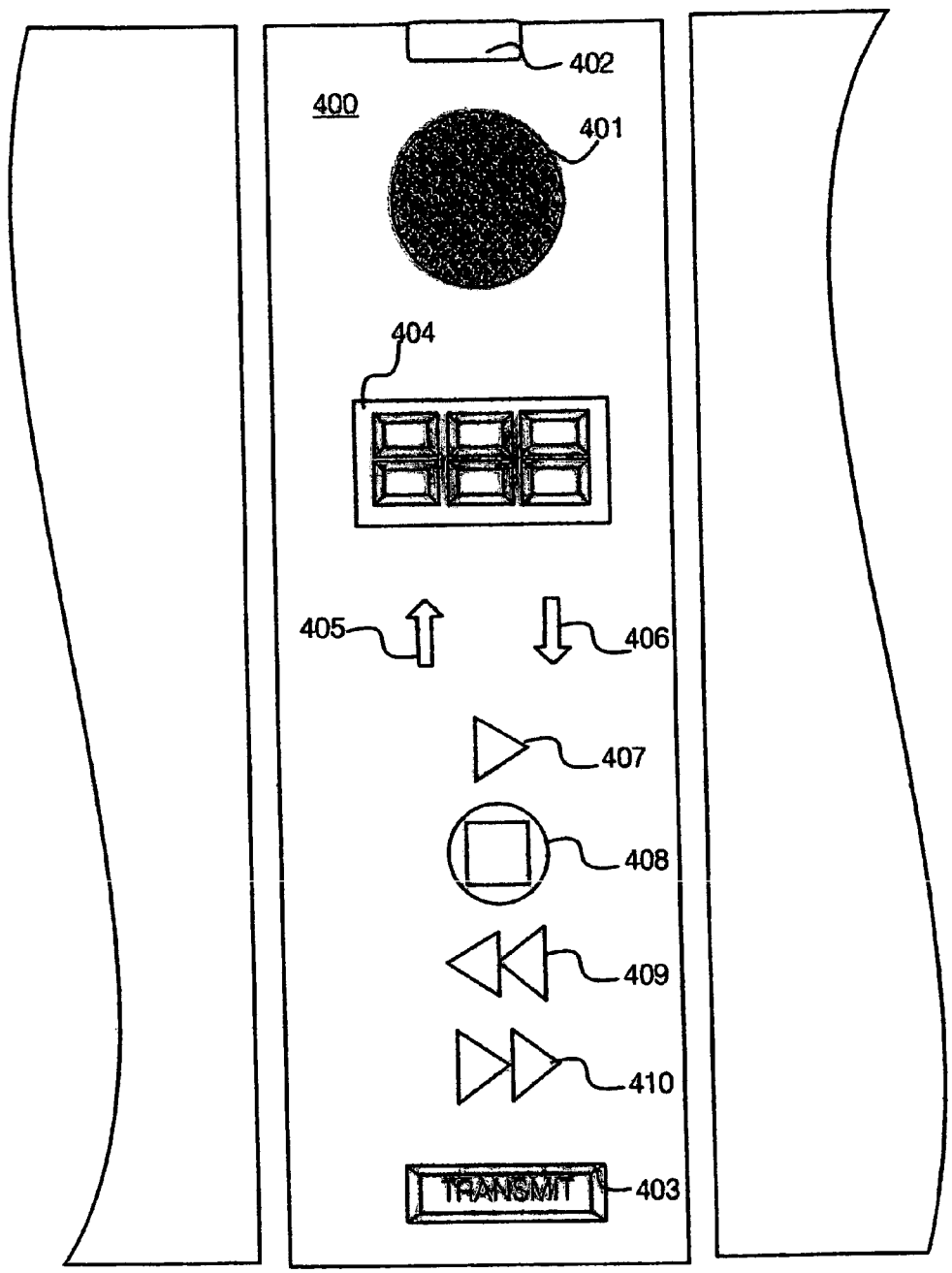
FIG. 4 is a front view of a user console of the first photograph album of FIG. 1.

FIG. 4 is a front view of features of the central user console 107 of the photograph album 120, as presented to a user, and incorporating speaker 401, a display arrangement and a user interface.

The console illustrated in FIG. 4 comprises a plastic molded casing 400 carrying audio speaker 401 (corresponding with speaker 108) for playback of aural sound bites; wireless antenna 402 (corresponding with antenna 307) for transmission of audio data to a remote playback device, for example a Bluetooth enabled audio playback device (not shown) capable of receiving audio data and recording and/or playing the audio data; transmit button 403 for activating wireless driver 306 for transmission of audio data via antenna 402; an alpha-numerical display 404 (corresponding to display 109), for example a liquid crystal display or LED display, for identifying a pocket position on the inside cover 100 of album 120, containing a data storage device 106; first and second pocket selector buttons 405, 406 (corresponding to button 114), for respectively incrementing and decrementing a counter in processor 311 to increment or decrement the number of a selected pocket and thereby select a particular data storage device 106. Processor 311 supplies an indication of the pocket position of the data storage device to an alpha numeric display on the display device 404 (corresponding to display 109 and display 309). Casing 400 also includes play button 407 (corresponding to button 110) for activating audio driver 309, processor 311 and EEPROM 312 to cause playing of an audio sound bite, from data downloaded from a selected data storage device 106; stop button 408 (corresponding to button 110) for activating processor 311 and deactivating audio driver 309 or wireless driver 306 to cause stopping of a play, fast forward or fast rewind operation of the audio sound bite data, or for stopping a transmission of audio data; rewind button 409 (corresponding to button 112) for activating processor 311 to cause reviewing of audio data selected by selecting a particular audio data device 106 at a selected pocket; and fast forward button 410 (corresponding to button 113) for activating processor 311 to cause forwarding of audio data of a selected data storage device 106 of a selected pocket.

Using the controls and display presented on the user console of FIG. 4, a user can easily and intuitively work out how to select a particular data storage device 106 in a particular pocket, by stepping through individual pockets. The alpha-numeric identifier of a particular pocket is simultaneously displayed on display device 404. The audio sound bite data of the displayed device is coupled to speaker 401 by the user activating play button 407. The user can obtain the aural sound bite without the need for instruction or help menus. The user interface 305 including display 404 and buttons 405–410, as well as button 403, employs known symbols, for example fast forward and fast rewind and play symbols, with the controls being immediately apparent as to their function and usage.

Further, due to the labeling of individual pockets 105 with numbers and/or letters, and corresponding labeling of photograph positions on the pages, the user can insert photographs in the album, and insert the corresponding data keys 106 in the correct pockets, intuitively and without instruction or help menus, such that a corresponding sound bite stored on a data storage device 106 is inserted in a correct pocket 105 corresponding with a location where the corresponding photograph is stored on the respective pages. The correct location is easily selected by stepping up or stepping down and reading the alpha-numeric display 404.

Figure 5:
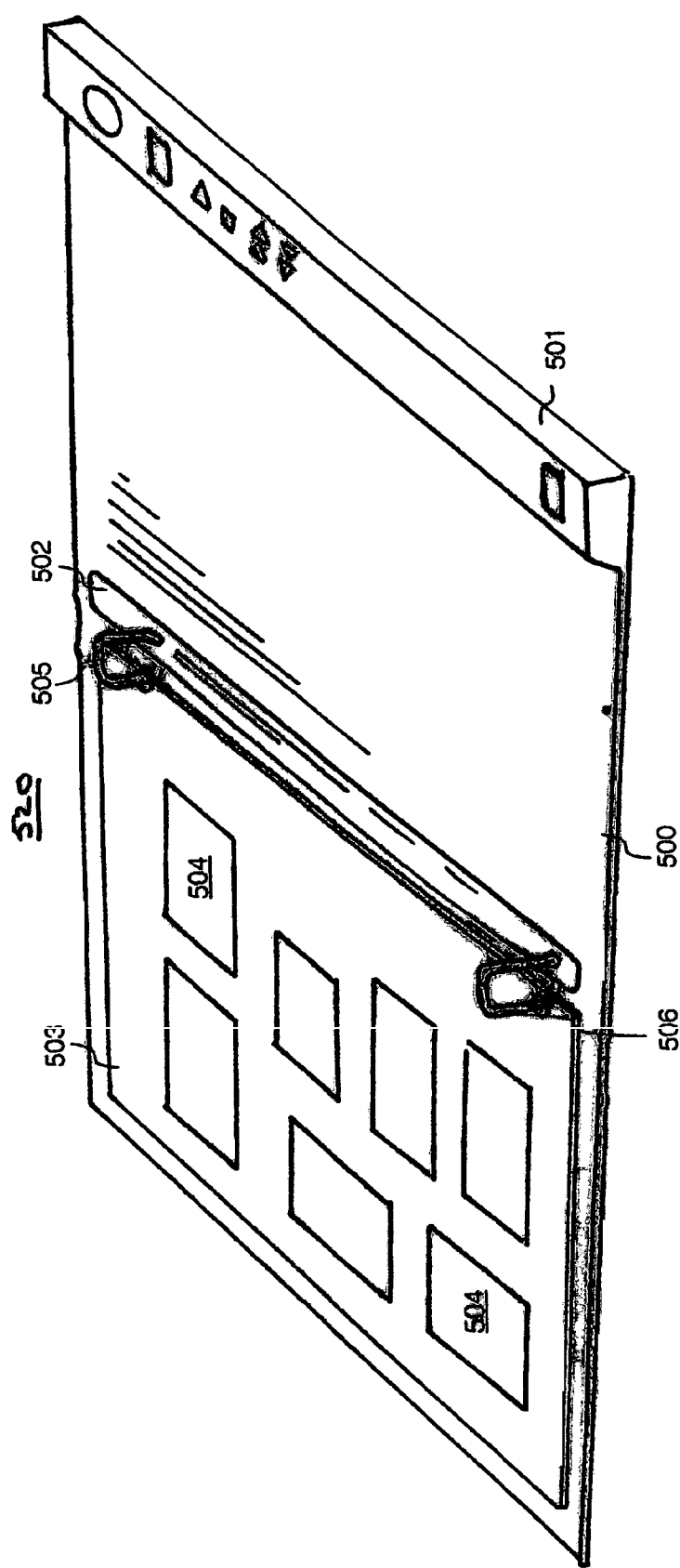
FIG. 5 is a perspective view of a second multi-media photograph album according to a second embodiment of the present invention.

FIG. 5 is a perspective view of a second multi-media photograph album 520 according to a second specific embodiment of the present invention. The second photograph album comprises a foldable cover 500 having, at one edge, a console 501; and having a ring-binder mechanism 502 for attaching a plurality of pages 503 for mounting of multimedia photographs 504 thereon.

Photographs can be mounted on both sides of the pages 503, and in a variety of configurations or patterns. Each page 503 has plural electrically conductive strips, which make contact with electrical contacts on the reverse side of the photographs 504, to access a data storage device comprising a photograph, which stores an audio sound bite, and/or digital data with information about the image on the photograph.

The pages 503 are removable and can fit in the ring binder 502 in loose leaf format. Electrical wipers connect the pages to the ring binder. Binder 502 includes an upper ring 505 and a lower ring 506 that respectively form first and second electrical contacts to the pages 503, thence to console 501.

Photographs 504 are typically placed arbitrarily on the pages 503 of a photograph album 520 as described herein. Further, users can move photographs 503 around the album, swapping page positions. It cannot be assumed that the photographs 504 are chronologically numbered or positioned on pages 503 of album 520.

Figure 6:
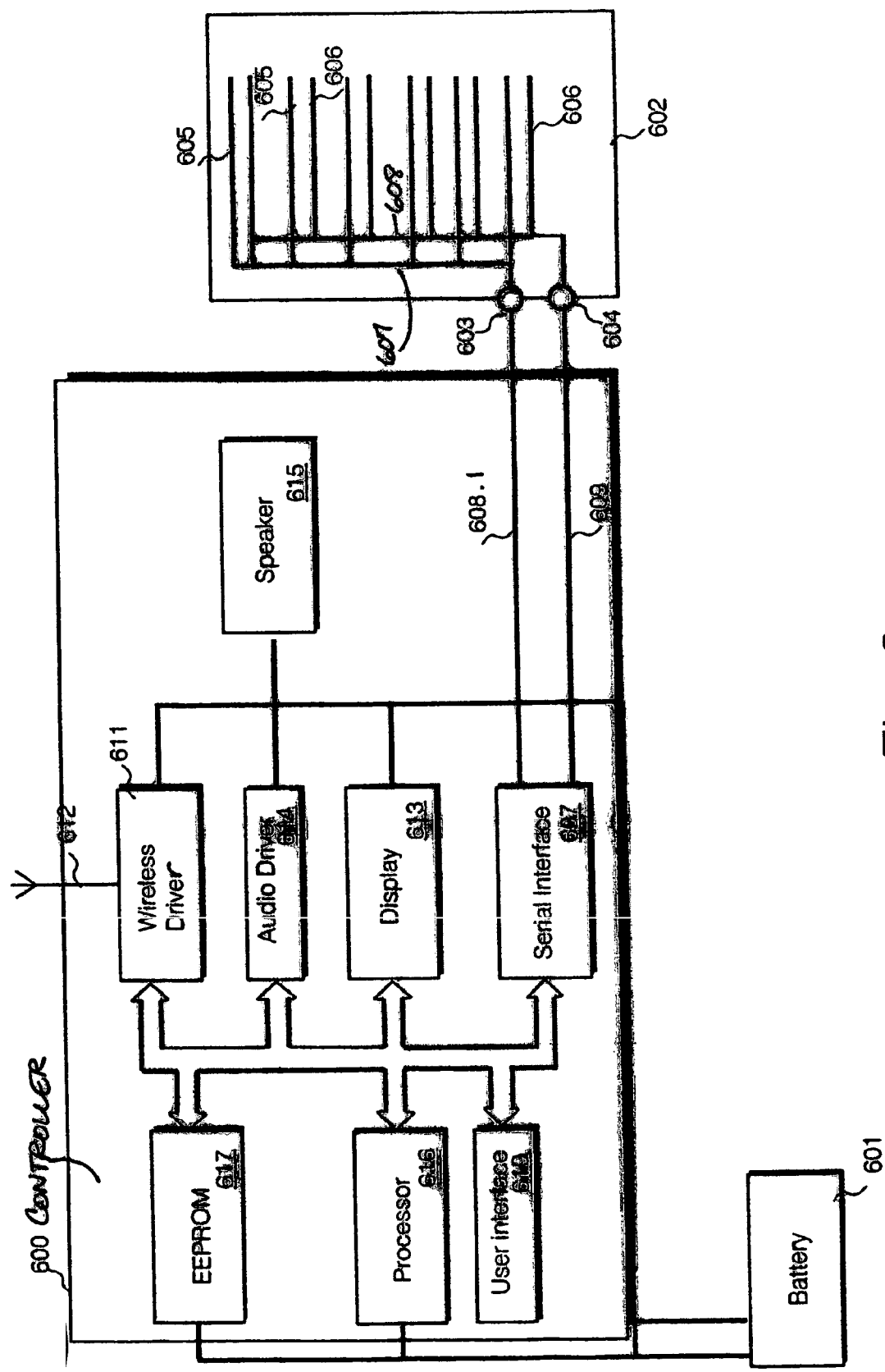
FIG. 6 is a schematic diagram of a controller and page arrangement of the second photograph album of FIG. 5.

FIG. 6 is an electric schematic diagram of components of the multi-media photograph album of FIG. 5. User console 501 comprises a controller unit 600, powered by a battery power supply 601. The controller unit 600 is connected to a plurality of pages 602 (corresponding to page 503), one of which is shown schematically in FIG. 6 as including a pair of conductive rings 603, 604 that engage electrically conductive rings 505 and 506. Each page 602 comprises a pair of electrically separated parallel vertically extending electrical conductors 607 and 608, and several pairs of horizontally extending parallel elongated electric conductors 605 and 606, such that each of conductors 605 is connected to conductor 607 and each of conductors 606 is connected to conductor 608. Each of conductors 605, 606 is arranged such that a plurality of individual multi-media photographs 503 attached to the page 601, make contact with the connectors 605 and 606, enabling sound bite data to be downloaded from each data storage device embedded in the photographs 504.

Decoder and audio data player 600 comprises (1) a serial interface 607, connected by electric leads 608.1 and 609 to rings 603 and 604, thence to the serial interface for addressing individual data storage devices in photographs 504 located on the page 602; (2) a user interface 610 for enabling a user to select individual data storage devices in photographs 504, and activate play of audio data stored in the data storage devices, or transmission of downloaded data to a remote device; (3) a wireless driver 611 (having an antenna 612), for sending the data read from a data storage device in photographs 504 to a remote play back device; (4) a display 613, for displaying data stored in selected individual data storage devices 607; (5) an audio driver 614 for driving a speaker 615 to play audio data from a selected data storage device in a selected one of photographs 504; (6) a processor 616 for controlling the user interface 610, display 613, serial interface 607, audio driver 614 and wireless driver 611 in response to input signals from user interface 610 according to program instructions stored in an electrically erasable programmable read only memory (EEPROM) 617; the EEPROM is also part of player 600.

Figure 7:
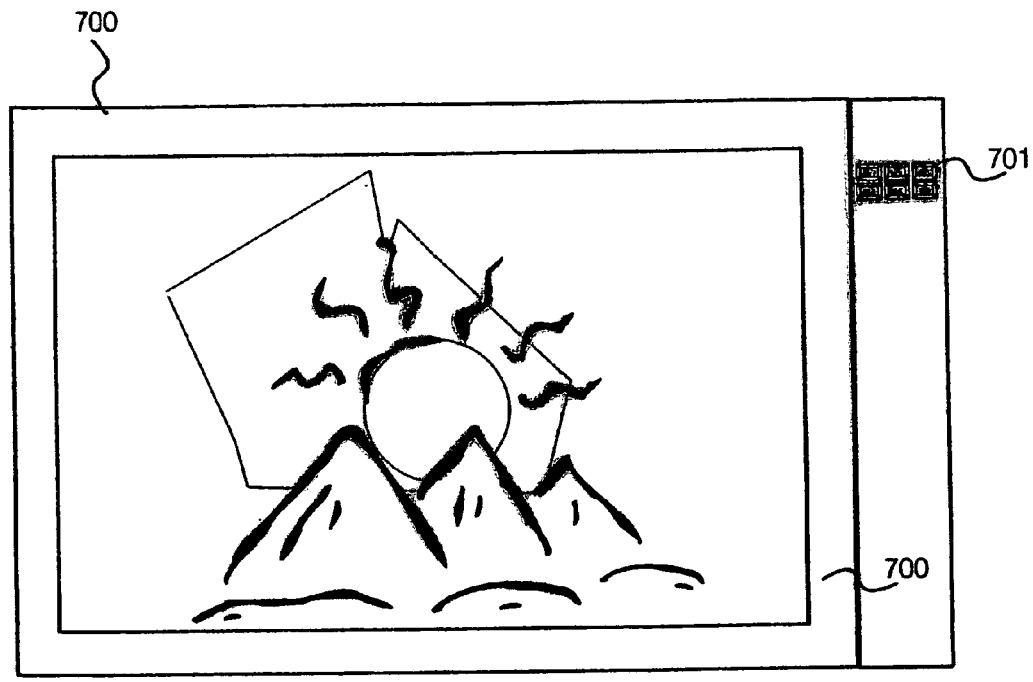
FIG. 7 is a front view of a displayed multi-media photograph, in combination with a data storage device and connector arrangement according to the second specific embodiment of FIG. 5 of the present invention.

FIG. 7 is front side view of a multi-media photograph 504 according to the second specific implementation of the present invention. The photograph 504 comprises a paper or card backing sheet 700 having a photographic coating, which is typically developed by a prior art photographic process.

Optionally, multi-media photograph 504 includes a display device 701 as an alternative to a display device 613 on decoder and audio data player 600 that forms a controller. When the multi-media photograph 504 is addressed by processor 616 of controller 600, the display device 701 is activated, indicating that the photograph associated with sheet 700 has been selected. The display 701 comprises, e.g., a simple light emitting diode, or an LED alpha-numeric display as shown in FIG. 7. Alternatively, display 701 includes a liquid crystal display, having either an alpha numeric display icon, or a specially designed display icon. The display device 701 can be integrated with the data storage device of FIG. 7, or can be provided as a separate component, connected to the data storage device by electrical connectors.

Figure 8:
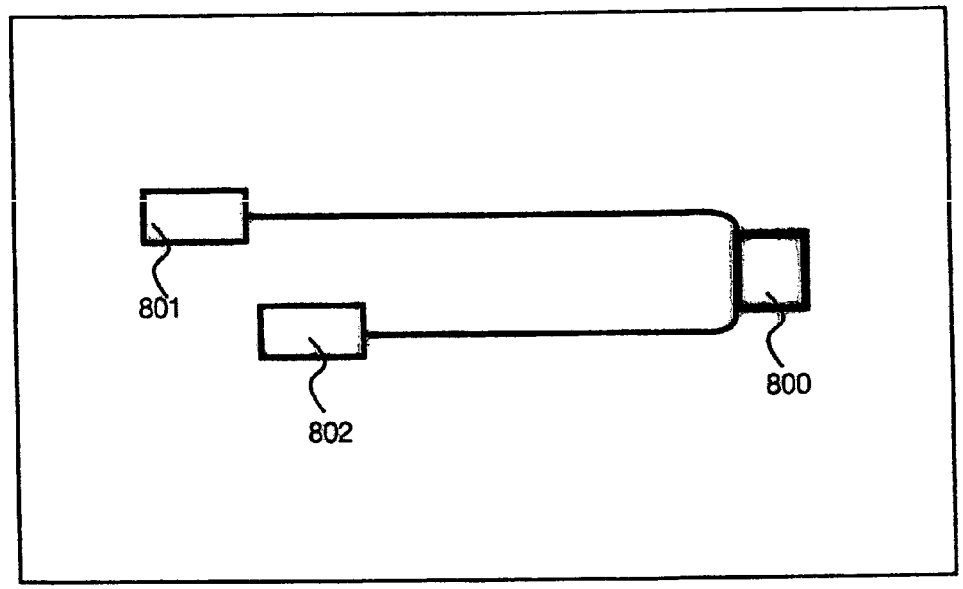
FIG. 8 is a back view of the multi-media photograph of FIG. 7.

FIG. 8 is a schematic diagram of the reverse side of the multi-media photograph of FIG. 7. The multi-media photograph comprises a data storage chip 800 bonded to a card substrate. The data storage chip 800 is suitable for storing an audio sound bite, as digital or analog audio data, and/or digital image data representing the image presented on the front of the photograph as shown in FIG. 7 herein. The data storage chip is electrically connected to first and second contacts 801, 802 carried by the card substrate so the contacts are exposed on the rearward face of the backing sheet 700 (i.e., opposite the photograph). Each of contacts 801 and 802 is arranged for making contact with the corresponding respective electrical conductor 605 and 606 on a page 602 of the multi-media photograph album. The chip 800 is accessed via the first and second contacts 801 and 802, and powered by a direct current (DC) flowing from battery 601 through the conductive strips 605 and 606 on the page 602, to supply power to the chip. Processor 616 preferably modulates the DC current to interrogate the chip 800. Chip 800 responds to the modulation to download, via serial interface 607. Interface 607 supplies the superimposed modulated signal representing the digital image data and/or audio data to a decoder in processor 616 of the second multi-media photograph album 520.

Figure 9:
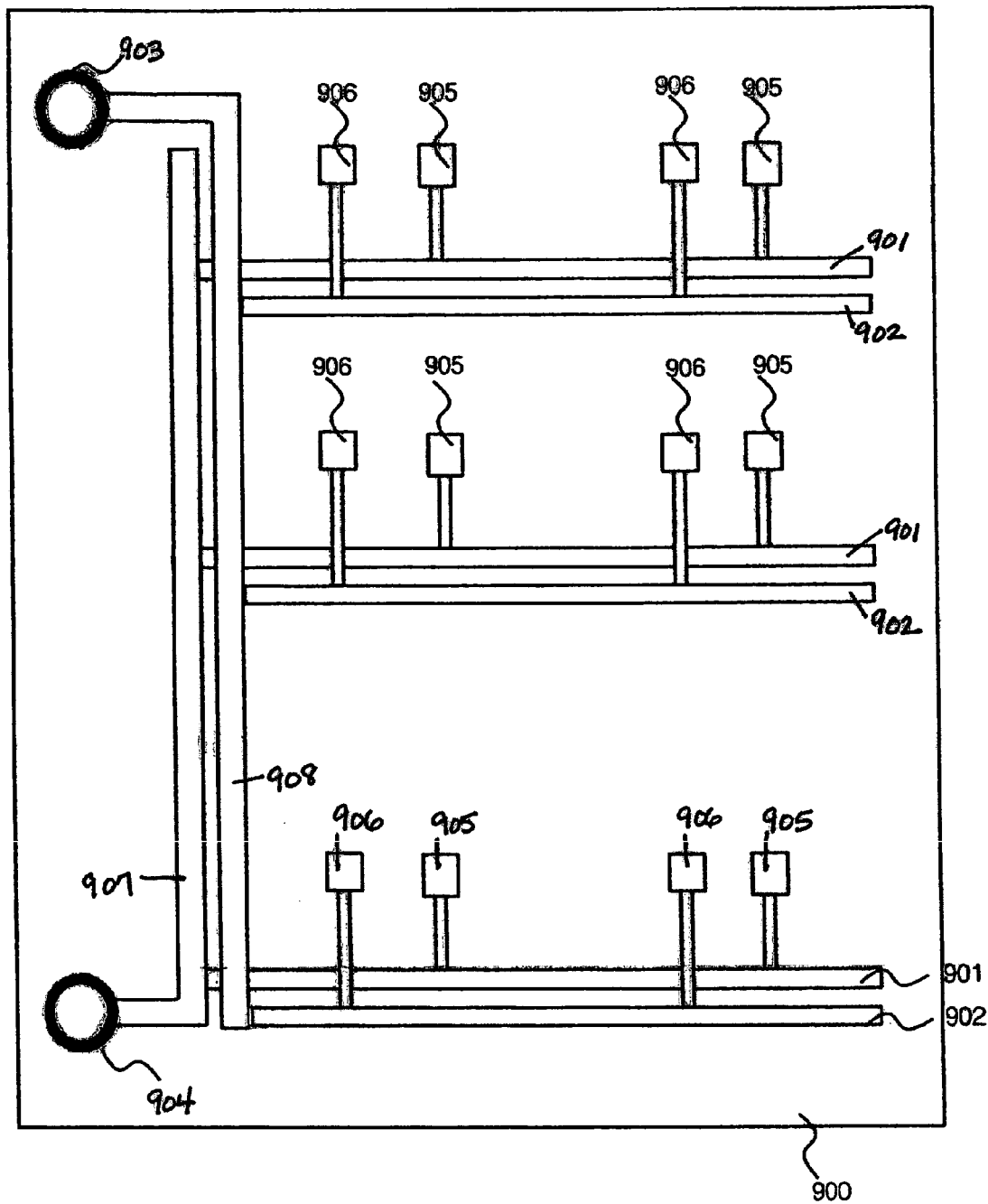
FIG. 9 is a layout diagram of a network of conductive tracks included on a page of the second photograph album of FIG. 5.

FIG. 9 herein is an electric and spatial schematic diagram of a conductive track layout of page 900 (corresponding to page 602) of the second multi-media photograph album 520. The page 900 comprises a sheet material, for example a plastic, or paper sheet material, having a plurality of horizontally extending elongated, spatially parallel printed electrically conductive tracks 901, 902 printed on a first side of the sheet material of page 900. The parallel conductive tracks 901, 902 are externally connectable with two electrical conductors 608.1 and 609 by first and second electrically conductive annular connectors 903, 904 respectively (corresponding with rings 603 and 604). The tracks 901 and 902 are connected to first and second electrical connectors 903 and 904, respectively mounted at the top and bottom of page 900, in turn connected to upper and lower ring binders of the second photograph album 520.

Each of conductive tracks 901 has a first plurality of vertically extending electrically conductive spurs 905 each terminating in a conductive pad having a size and position suitable for connecting with an electrical connector 801 on the reverse side of a multi-media photograph 700. Each of conductive tracks 902 has a second set of conductive spurs, 906, each terminating in a conductive pad having a size and position suitable for connecting with an electrical connector 801 on the reverse side of the photograph 700. Each of tracks 901 is mechanically and electrically connected to vertically extending elongated electrically conductive strips 907 (corresponding to strip 607), while each of tracks 902 is mechanically and electrically connected to elongated electrically conductive strip 908. Horizontally extending ends of strips 907 and 908 are electrically and mechanically connected to rings 904 and 903 respectively.

The plural tracks 901 and 902, spurs 905, 906 and associated pads represent an embodiment of a connector network. In the example shown, the tracks, spurs and pads form a pair of conductors adapted to be connected to a pair of conductive pads 801 and 802 on the reverse side of each of a plurality of multi-media photographs 700, whereby each multi-media photograph 700 can be placed and arranged by a user in a plurality of different orientations and positions on each page 900.

FIG. 9 is an illustration of one side of a page; a reverse side of the page can have a similar surface network of conductors, again there being two conductors serving an entire single page.

Figure 10:
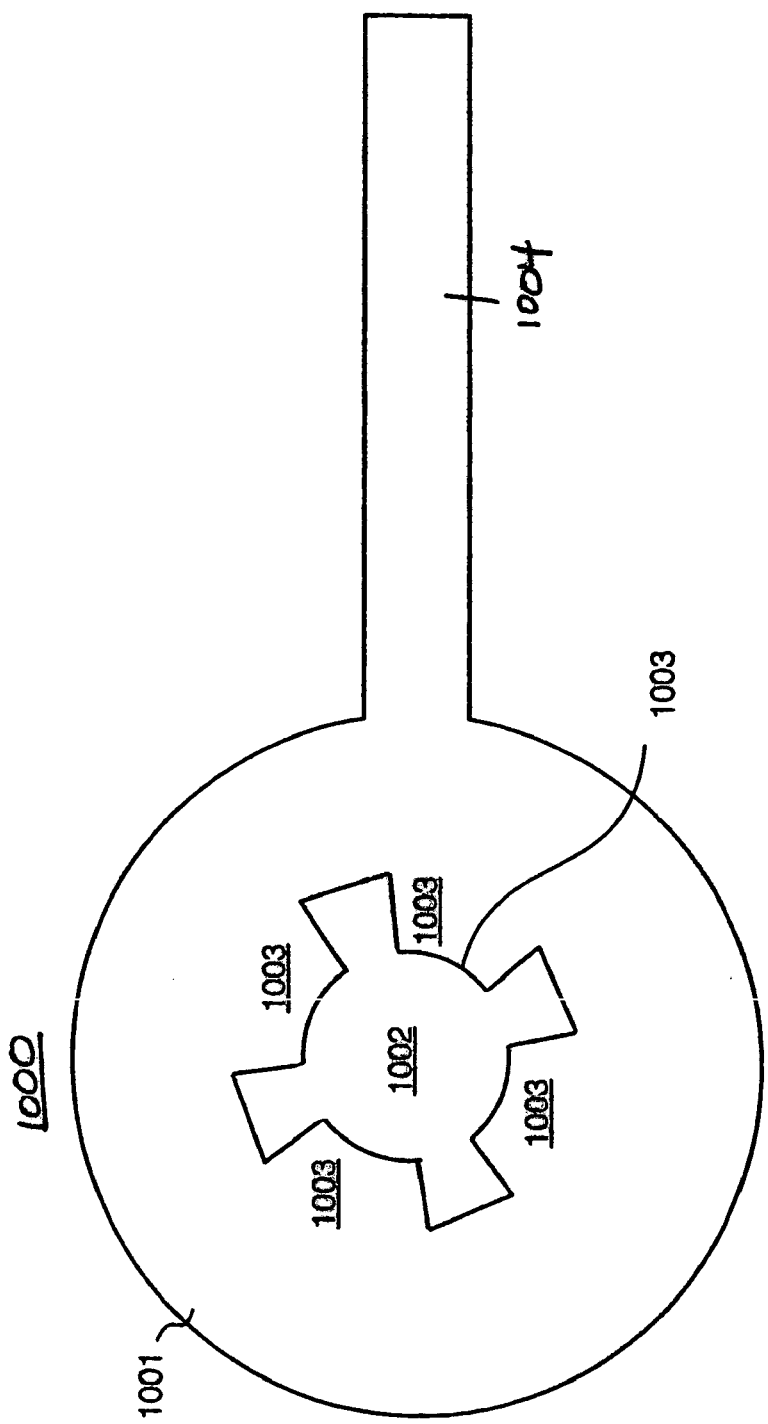
FIG. 10 is a front view of a page connector for connecting a page of the photograph album of FIG. 5 to a ring binder mechanism.

FIG. 10 is a top view in greater detail of an electrically conducting connector 1000 for connecting to a ring binder connector 1100 (FIG. 11) of the second multi-media photograph album 520. The connector 1000 comprises a sheet of metallic spring material 1001 that surrounds an aperture 1002 through which a ring binder connector 1100 passes. A plurality of fingers 1003 having arcuate ends define surfaces of aperture 1002. Fingers 1003 are pressed out of the spring material and form resilient wipers, which permanently contact an outer-surface of ring binder connector 1100, to thereby provide permanent electrical contact between connector 1000 and binder connector 1100. Connector 1000 also includes elongated horizontally extending metal strips 1004 that are connected to the horizontally extending ends of strips 907 and 908.

Figure 11:
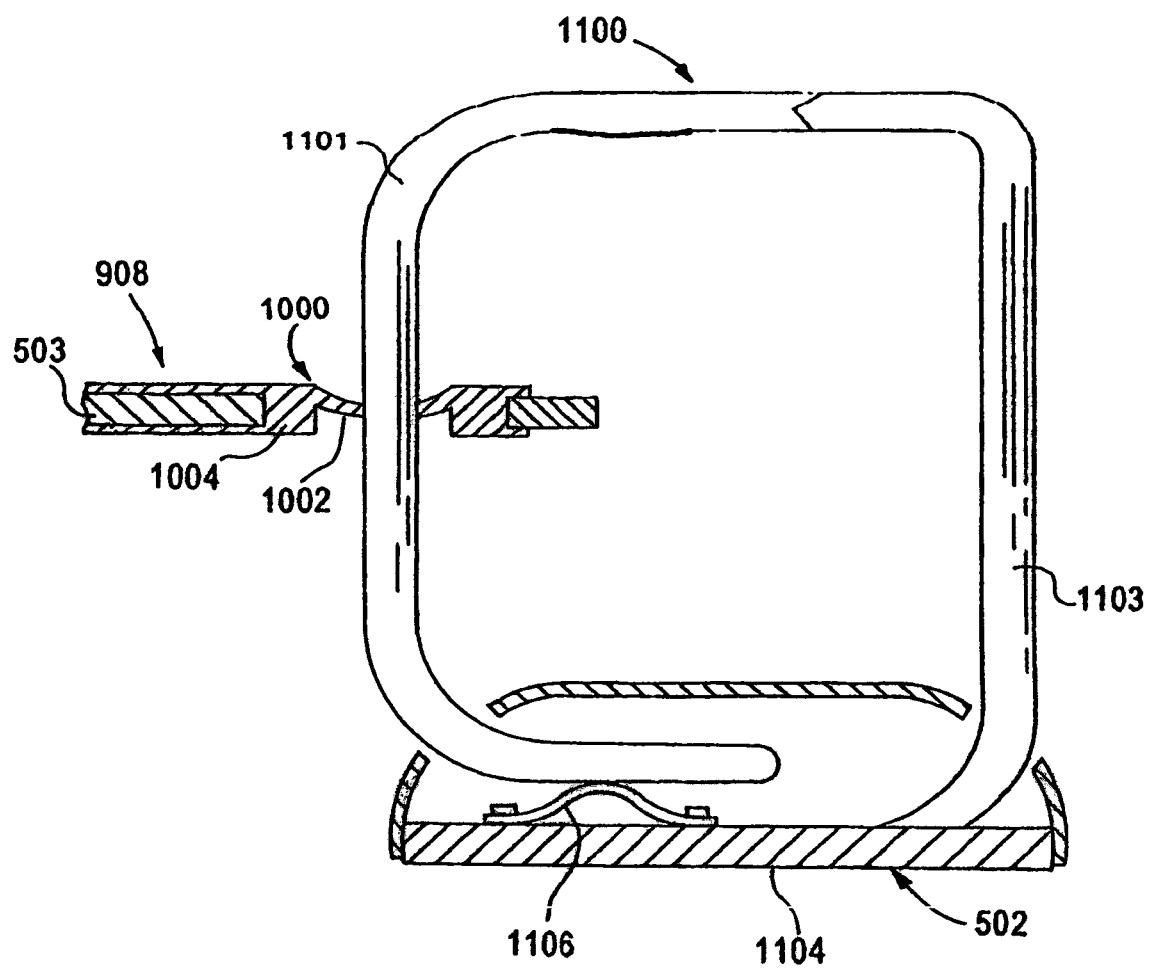
FIG. 11 is a sectional view of a ring binder mechanism of the photograph album of FIG. 5, for mechanically and electrically connecting a plurality of loose leaf pages.

FIG. 11 is a cross-sectional view of a portion of a page of photograph album 520 to indicate the connecting structure between the conductive strip 907 on page 900 to ring binder 1100 (corresponding to binder 505 and 603), which is connected to line 608.1. A similar binder arrangement is provided for connecting strip 908 to line 609. Binder 1100 includes mating metal segments 1101 and 1103, such that segment 1103 is fixedly mounted on spine 1104 of ring binder mechanism 502. Spring mechanism 1106 on spine 1104 urges segment 1101 against segment 1103 thereby closing binder 1100 in a first position. Binder 1100 is manually opened such that the first and second binder segments 1101 and 1103 are separated, causing a gap, over which the connector member 1000 of page 900 can be slid to release the page from the binder and insert the page onto segment 1101. Segment 1103 is connected to lead line 608.1 to provide an electrical connection between chip 800 and controller 600 via pads 801, 905, lines 901, 907, connector 1000, binder segments 1101, 1103 and line 608.1. The connection between chip 800 and controller 600 is broken when segment 1101 and 1103 are separated.

Figure 12:
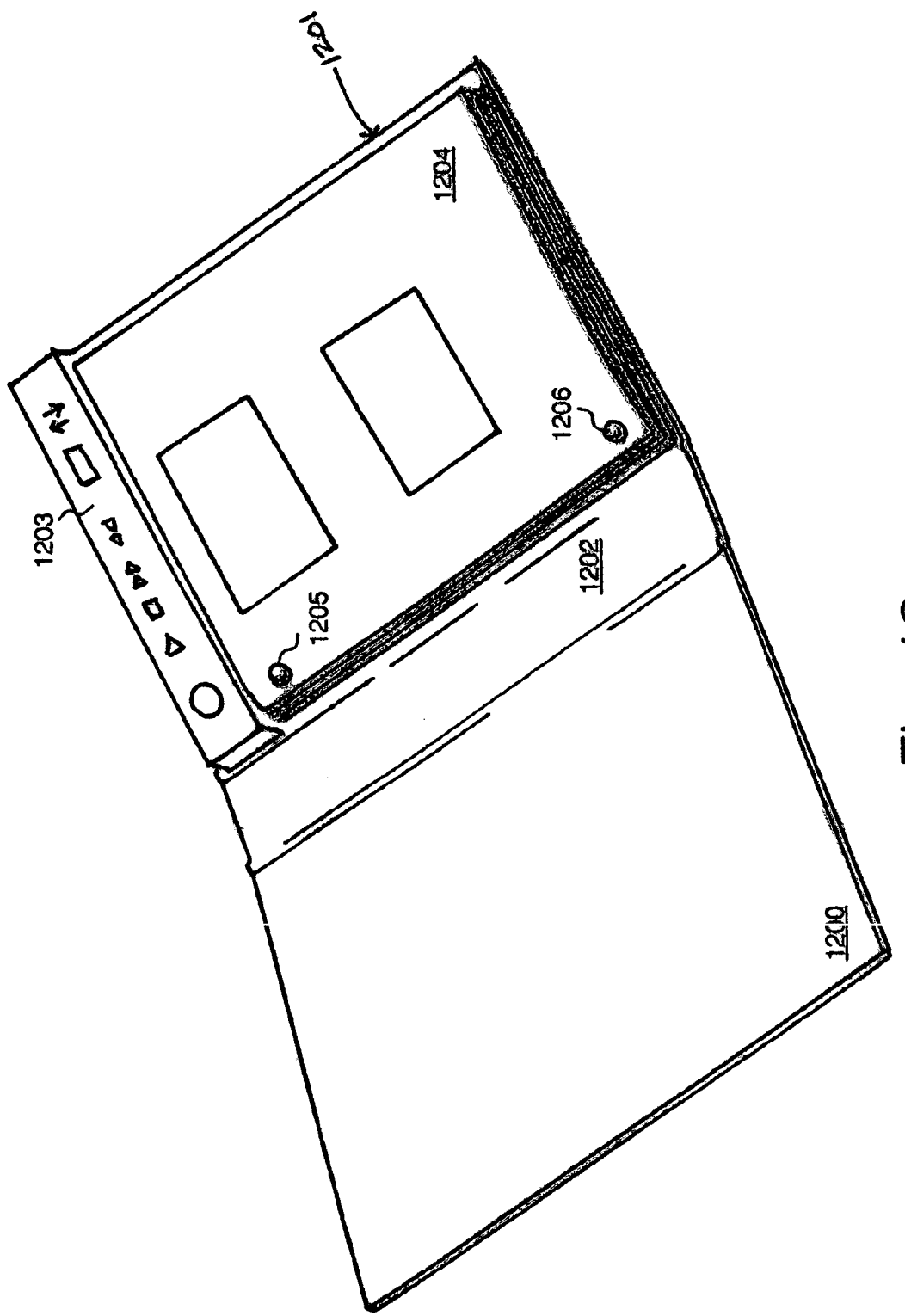
FIG. 12 is a perspective view of a third multi-media photograph album according to a third embodiment of the present invention, wherein the third photograph album has a plurality of bound pages.

FIG. 12 is a perspective view of a third multi-media photograph album, according to a third specific embodiment of the present invention. The third multi-media photograph album comprises a front cover 1200; a back cover 1201; a spine 1202 connecting the front and back covers; and a user console 1203 mounted on back cover 1201. Console 1203 comprises a processor, user interface, display, audio driver, speaker, optionally a wireless driver for transmitting audio data and/or image data to a remote playback device, a battery power supply and a serial interface for interrogating a plurality of data storage devices, substantially as herein before described with reference to the first and second embodiments. Back cover 1201 carries plural pages 1204, each of which can carry mounted multi-media photographs.

Each multi-media photograph comprises a sheet material, and an electrically addressable data storage device storing audio data and/or image data. Each page 1204 includes a network of conductive strips, to which contact pads of the multi-media photographs make contact when the photographs are attached to a particular page, thereby allowing the serial interface of console 1203 to address the data storage device of the particular multi-media photograph.

Pages 1204 are bound together and electrically connected together by plural conductive pins 1205, 1206 that extend through openings at the top and bottom of the page in close proximity to spine 1202. Each of pins 1205 and 1206 is connected to a surface network of a plurality of conductive tracks on each of pages 1204, such that two separate sets of conductive tracks extend across each page, to provide connections of pairs of electrical connectors of a plurality of data storage devices to the conductor array.

Each page 1204 has markings indicating positions at which multi-media photographs can be attached to the particular page. The positions are addressable by the console 1203 similarly as described herein before with reference to the second embodiment. Photograph position identifiers appear on a display device, which can be incremented or decremented by a user. Upon selecting a position of a photograph, the user can activate downloading of audio data and/or image data from a multi-media photograph. In the case of audio data, the audio data can be immediately played back via a speaker included in console 1203 or can be sent to a remote playback device via a wireless link. Image data can be sent to a remote storage and/or display device or printer by the wireless link, for example be sent to a personal computer via a Bluetooth or similar wireless link.

Figure 13:
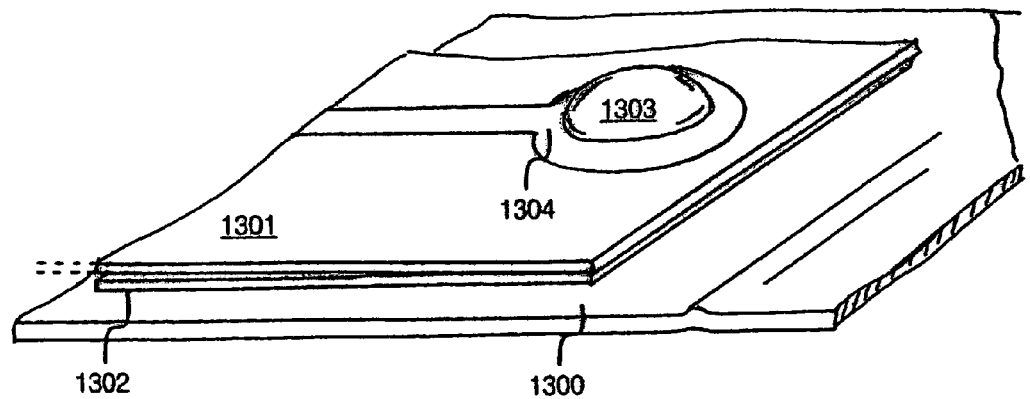
FIG. 13 is a perspective view of a detail of a connector arrangement for a plurality of pages of the photograph album of FIG. 12 to a back cover of the album.
Figure 14:
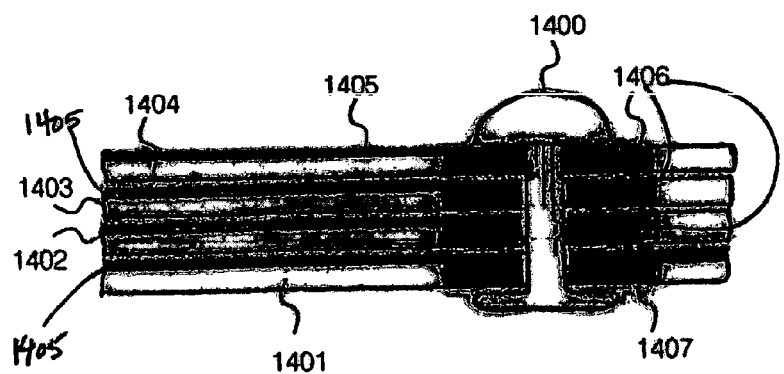
FIG. 14 is a cross-sectional view of the connection shown in FIG. 13.

Referring to FIGS. 13 and 14 herein, there is illustrated schematically connections of the pages to the back cover of the multimedia photograph album of FIG. 12, ensuring electrical connection to the plurality of arrays of conductors.

FIG. 13 is a perspective view of a section of back cover 1300 (corresponding to back cover 1201), having two attached pages 1301, 1302, through which pin connector 1303 extends. The pin connector 1303 is made of an electrically conductive material and connects through an annular conductive track 1304 coated onto first page 1301, and similarly through a corresponding annular conductive track coated onto the second page 1302 thereby making electrical contact with conductors on both the first and second pages. Each of pages 1301 and 1302 can have conductors coated on both sides of the page, or only one side of the page.

FIG. 14 is a cross-sectional view of a portion of a photograph album of FIG. 12, but including back cover 1401 and pages 1402–1404. Electrically conductive pin 1400 extends through aligned openings in cover 1401 and pages 1402–1404 to the back cover and pages 1402–1404. Each of cover 1401 and pages 1402–1405 is coated with an electrically conductive track 1405 that is electrically connected to electrically conductive ring 1406, which is attached to and extends through the thickness of the particular page. The conductive pin 1400 compresses pages 1402–1404 and rings 1406 together, thereby establishing electrical connection between the respective connectors of each page. Pin 1400 also compresses an annular conductive ring 1407 of the back cover, which is connected to the serial interface within the console of the third photograph album. The individual conductors on each of pages 1402–1404 can be addressed via the serial interface of console 1203, through the electrical connections created by the pin 1400 and the plurality of annular conductors 1406 and 1407 on the pages 1402–1404 and back cover 1401.

In the embodiment in which the data storage devices have a pair of conductors, data can be downloaded by applying a modulation signal to interrogate a data storage device and digital or analog data can be recovered from the data storage device as an analog signal.

Figure 15:
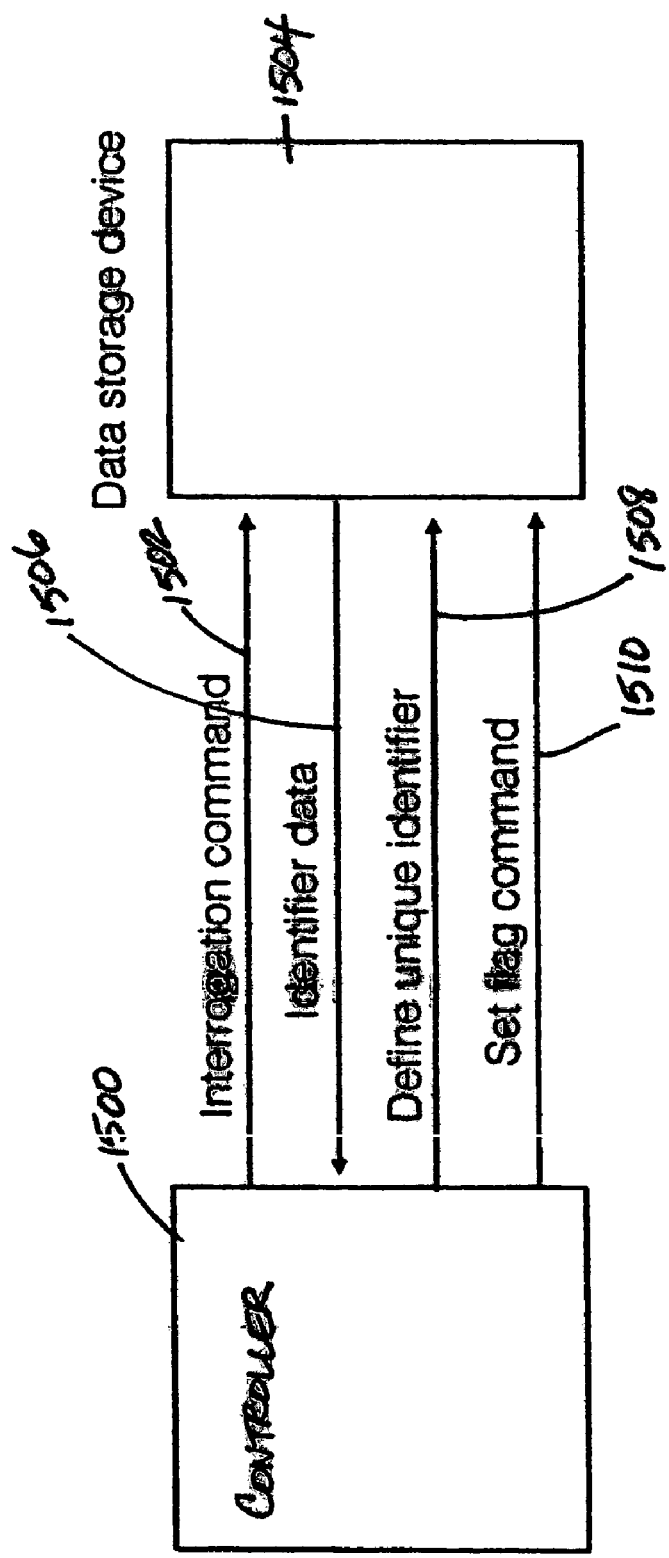
FIG. 15 is a block diagram of a system for addressing individual data storage devices applicable to any of the embodiments of FIGS. 1–14 of the present invention when a new data storage device is added to a multi-media photograph album.

FIG. 15 is a schematic illustration of one exemplary protocol for interrogating a data storage device as shown in FIGS. 1–4 and 5–12 via a serial interface. In response to insertion of a data storage device 1502 (which can correspond with device 106 or photograph 700) for the first time into a multimedia photograph album, the controller 1500 (that can correspond with controller 300 or 600) automatically issues an interrogation command that interrogates data storage device 1502. The interrogation command requests unique identifier data the data storage device 1502 stores. The data storage device 1502 responds by supplying line 1506 and controller 1500 with the unique identifier data, if device 1502 has been programmed previously. However, if data storage device 1502 has not been programmed with the unique identifier data, device 1502 does not derive a response signal. Alternatively, controller 1500 supplies a random response to the data storage device 1502 via line 1504. If controller 1500 cannot read the unique identifier data that data storage device 1502 supplies to the controller via line 1506, the controller proceeds to define a unique identifier data, corresponding to a grid location on a page, and to send that unique identifier data via line 1508 to the data storage device 1502, which stores it. The controller 1500 then sets a flag command which the controller supplies to data storage device 1502 via line 1510. The flag command on line 1510 activates the data storage device 1502 to set a flag that prevents the unique device identifier data stored in device 1502 from being overwritten without first unsetting the flag command. The flag command thereby locks the unique identifier data into the data storage device 1502. Subsequently, the controller 1500 can uniquely identify that data storage device on a page of the album. The unique identifier data that identifies the data storage device 1502 can be initially accessed, if only one data storage device is added at a time, since the controller 1500 stores a table of individual data storage devices stored in the album, and their unique identifier data. Any found unique identifier data which does not correspond to identifier data in an existing took up table, is treated as a newly added data storage device.

Figure 16:
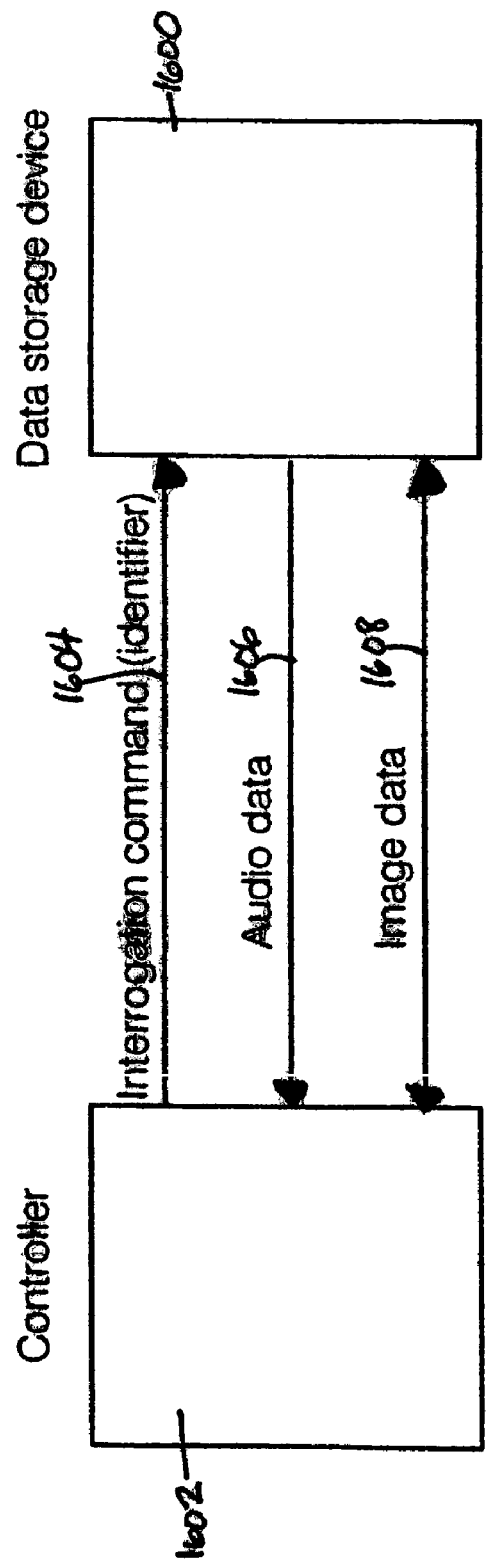
FIG. 16 is a block diagram of a system for uniquely addressing a data storage device contained in a photograph album according to any of the previous specific embodiments of FIGS. 1–14 for downloading audio/image data from the data storage device.

FIG. 16 is a schematic diagram of a read operation of data storage device 1600 (corresponding to device 106 or photograph 700). Controller 1602 sends an interrogation command 1604 to data storage device 1600 across the surface area network of conductive tracks of the plurality of pages. The interrogation command 1604 includes the unique identifier data identifying a selected data storage device.

Because of the connectivity of the conductive track network, all data storage devices receive the identifier data. However, only the data storage device 1600 having that unique identifier data of command 1604 responds, since only that device is addressed with the identifier data of the command. The data storage device 1600 recognizes the unique identifier data in command 1604 and in response to receiving that unique identifier data sends audio data 1606 and/or image data 1608 which is loaded in the internal memory in the data storage device, across the conductive network, which is received by the controller 1602.

Although three specific embodiments have been described hereinbefore which rely on physical contact between a pair of electrical contacts on the data storage device and a plurality of conductive tracks, a variation which can apply to any or all of the three embodiments utilizes a contactless wireless connection between a data storage device (e.g., a device similar to device 106 or photograph 700) and the plurality of conductive tracks. In a contactless embodiment of each of the embodiments, a data storage device can be provided with a transponder tag, for example of a prior art type comprising a spiral electrical conductor coil, which can be energized by being placed in an alternating electric field, such that in response to the array of conductive strips being driven by an alternating current, the transponder tag is energized and is capable of having data written to it, or of having data from the transponder tag. Such contact with transponder tags can be implemented by known radio frequency identifier (RFID) tags comprising a printed antenna or loop aerial on a substrate which, when placed near a corresponding readout device, is capable of downloading data by a wireless connection without the need for physical electrical contacts. One or a plurality of readout devices can be embedded within a page or cover of a photograph album as described herein. To provide such a solution, each page (or where appropriate, cover) needs to have one or a plurality of aerials embedded therein and each data storage device includes an antenna which lies in a detectable field generated by the aerial, when the data storage device is mounted on the page or cover.

It will be appreciated that for all embodiments, where data is transferred to an external or peripheral device by wireless link, the external or peripheral device must be of a type suitable for handling the type of data transmitted. Peripheral devices which can receive data transmitted from specific embodiments of the invention include the following:

in the case of transmission of video data, a device capable of receiving video data such as a video recorder, or television receiver or a personal computer;

in the case of still image frames, a printer or a display device such as a television receiver or personal computer;

in the case of audio data, an audio playback system, a television receiver or a personal computer; and in the case of meta-data, a personal computer or hand-held computer, for examples a PALM held device or a printer for printing out.

Figure 17:
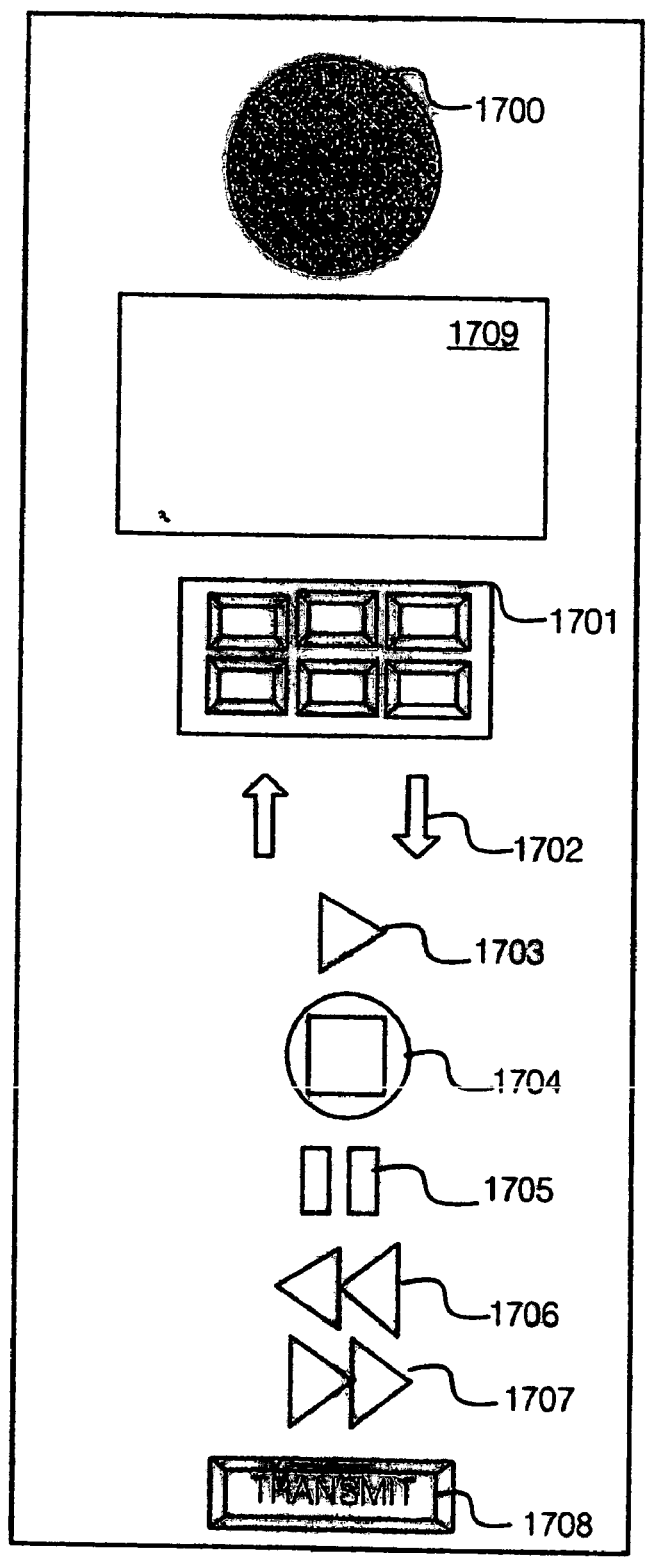
FIG. 17 is a front view of a user console comprising a video screen for playing back video sequences and still images suitable as a variation of any of the above implementations.

FIG. 17 is a front view of a modified console applicable to each of the previously described photograph album embodiments; the console of FIG. 17 is able to display video data stored in a data storage device of the album. The console of FIG. 17 comprises, in addition to a speaker 1700, an alphanumeric display device 1701, a pair of selector buttons 1702, a play button 1703, a stop button 1704, a pause button 1705, a rewind button 1706, a fast forward button 1707 and a wireless transmission button 1708, and a video screen 1709, for example a liquid crystal display video screen of a known type.

Video sequences can be downloaded from a data storage device as hereinbefore described, and played, rewound, fast forwarded or paused using the control buttons 1703–1707 for controlling processor 311 or 616. Processor 311 or 616 is programmed to respond to buttons 1702–1707 to provide display of still images on the video display 1709. To this end, a user selects a data storage device using alphanumeric display 1701 or one of selector buttons 1702 which results in playing the video sequence. The user then pauses the video sequence using pause button 1705 to maintain a still image display on the video screen 1709.

What is claimed is:

1. A photograph album for storing a plurality of photographs, said photograph album comprising:
    a plurality of pages for mounting two dimensional photographs;
    an array of conductive tracks arranged for communicating with a plurality of data storage devices for storing data related to said photographs and adapted to be carried by said album; and
    a controller for:
    (a) selecting individual ones of said data storage devices carried by said album; and
    (b) reading said data stored in said individual data storage devices;
    said controller comprising:
    a video circuit for enabling display of video sequences downloaded from said data storage devices;
    a video display for displaying video sequences downloaded from data storage devices; and
    an image display for displaying a still image downloaded from one of said data storage devices.

2. The photograph album as claimed in claim 1, wherein said controller comprises:
    a serial interface for sending a signal over said plurality of conductive tracks, said signal being arranged for interrogating different ones of said plurality of data storage devices at different times.

3. The photograph album as claimed in claim 1, wherein said controller comprises a user interface, said user interface being operable to allow a user to:
    (a) select individual data storage devices; and
    (b) download data from a selected one of said data storage device.

4. The photograph album as claimed in claim 1, wherein said controller comprises:
    an audio circuit for playing audio data downloaded from said data storage devices.

5. The photograph album as claimed in claim 1, wherein said controller comprises:
    a wireless transmitter for transmitting said read data to a remote play back device.

6. The photograph album as claimed in claim 1, wherein each page comprises:
    a plurality of antenna devices, said plurality of antenna devices being arranged to extend across the width and height of said page for providing plural positions upon which a transponder device of a said data storage device can be placed in close physical proximity to, in order to send and receive signals to an individual one of said antenna devices.

7. The photograph album as claimed in claim 1, wherein each of said pages comprises:
    a plurality of said conductive tracks, said plurality of conductive tracks extending across the width and height of said page for providing a plurality of positions upon which an electrical contact of a said data storage device can be placed for contacting at least one of said conductive tracks.

8. The photograph album as claimed in claim 1, wherein:
    said plurality of pages are permanently bound to each other, such that said plurality of conductive tracks of each of said pages form said array of conductive tracks, said array extending over said plurality of pages.

9. The photograph album as claimed in claim 1, wherein:
    said plurality of pages are bound within said photograph album by a pair of ring binders for providing physical attachment of said plurality of pages within said photograph album and electrical connection to said conductive tracks of each said page.

10. A photograph storage system, said photograph storage system comprising:

a photograph album and a plurality of data storage devices adapted to be carried by said album and capable of storing data corresponding to a photograph stored in said photograph album, said photograph album comprising:

at least one substantially two dimensional array of electrically conductive tracks, said plurality of conductive tracks being arranged for communicating with at least one of said data storage devices; and a controller for individually addressing each of said plurality of data storage devices communicating with said array of conductive tracks, for downloading data from said data storage devices;

at least one of said data storage devices comprising (a) an electronic memory for storing electronic data, and (b) at least one conductor for providing electrical access to said memory via said tracks;

at least one of the data storage devices being carried by a photograph, and said photograph album further comprises:

a ring binder mechanism: and a plurality of loose leaf pages, each of said loose leaf pages carrying a network of electrically conductive tracks arranged such that placement of one of said photographs on one of said pages enables electrical connection of the data storage device carried by said photograph with said electrically conductive tracks.

11. The photograph storage system as claimed in claim 10, wherein said photograph album further comprises:

a plurality of pockets having spatial positions corresponding with the said array of conductive tracks.

12. The photograph storage system as claimed in claim 11 wherein said plurality of pockets are arranged in rows and columns and individual pairs of said conductive tracks extend across a set of pockets of said plurality of pockets.

13. A multi-media photograph album for storing a plurality of photographs, said photograph album comprising:

an array of conductive tracks arranged for contacting a plurality of data storage devices for storing electrical signals representing digital data associated with an image and adapted to be carried by said album;

a user interface for enabling a user to select a said data storage device, said user interface comprising a visual display arranged to identify a physical position of said conductive track network;

a controller coupled with the user interface for addressing and downloading said data from said selected data storage device in response to a selection by the user activating the user interface to select a particular data storage device; and a play-back circuit for playing said data downloaded from a selected data storage device.

14. A multi-media photograph album for storing a plurality of photographs, said photograph album comprising:

an array of conductive tracks arranged for contacting a plurality of data storage devices for storing electrical signals representing digital data associated with an image and adapted to be carried by said album;

a user interface for enabling a user to select a said data storage device;

a controller coupled with the user interface for addressing and downloading said data from said selected data storage device in response to a selection by the user activating the user interface to select a particular data storage device; and a play-back circuit for playing said data downloaded from a selected data storage device said user interface comprising:

a visual display arranged to identify an individual one of said data storage devices connected to said array of conductive tracks; and a controller for incrementing and decrementing a selected physical position on said conductive track network.

15. The multi-media photograph album as claimed in claim 13, further comprising:

an interface for interfacing with said array of conductive tracks, said interface being capable of addressing individual ones of said data storage devices connected to said array of conductive tracks.

16. A method of addressing individual data storage devices in a photograph storage system, said photograph storage system comprising:

a photograph album and a plurality of data storage devices, said photograph album comprising:

at least one array of electrically conductive tracks, said plurality of conductive tracks arranged for engaging at least one said data storage device; and a controller capable of individually addressing each of said plurality of data storage devices engaging said array of conductive tracks for downloading data from said data storage devices;

one of said data storage devices comprising an electronic memory storing electronic data and at least one conductor providing electrical access to said memory;

said method comprising the steps of:

sending an interrogation command having a device identifier from said controller across said array of electrically conductive tracks to said data storage devices;

reading data stored in said memory of said data storage device having the device identifier; and coupling the read data stored in said memory of said data storage device to a user of the album;

said read and coupled data comprising video sequence data representing a video sequence matching a corresponding respective photograph stored in said photograph album.

17. The method as claimed in claim 16, wherein said read and coupled data comprises:

audio data representing a sound bite of audio sound matching a corresponding respective photograph stored in said photograph album.

18. The method as claimed in claim 16, wherein said read and coupled data comprises: meta-data, said meta-data comprising data selected from the set comprising: data describing a time and date of collection of image data associated with the photograph;

data describing a person who captured image data associated with the photograph;

bibliographic data describing the position of said image data within a collection of individual image data items.

19. The method as claimed in claim 16, wherein said read and coupled data comprises:

image data representing an image matching a corresponding respective photograph stored in said photograph album.

20. A method of addressing individual data storage devices in a photograph storage system, said photograph storage system comprising:

a photograph album and a plurality of data storage devices, said photograph album comprising:

at least one array of electrically conductive tracks, said plurality of conductive tracks being arranged for engaging at least one said data storage device; and a controller capable of individually addressing each of said plurality of data storage devices engaging said array of conductive tracks for downloading data from said data storage devices;

a said data storage device comprising an electronic memory storing electronic data and at least one conductor providing electrical access to said memory;

said method comprising the steps of:

sending an interrogation command having a device identifier from said controller via said array of electrically conductive tracks;

at the controller responding to no identifier data being received from any data storage device in response to said interrogation command, by defining a new unique identifier data and sending said new unique identifier data on said plurality of conductive tracks;

storing said unique identifier data in one of said data storage devices; and then at said controller issuing a flag set command, setting a flag within said data storage device in response to the issued flag set command, at said data storage device responding to the set flag, by locking said received identifier data in a memory of said data storage device, thereby uniquely identifying said data storage device.

* * * * *